March 25, 1930.  B. C. TRAVIS  1,751,772
DEVICE FOR FORMING ELLIPTICAL PARTS
Filed April 6, 1927
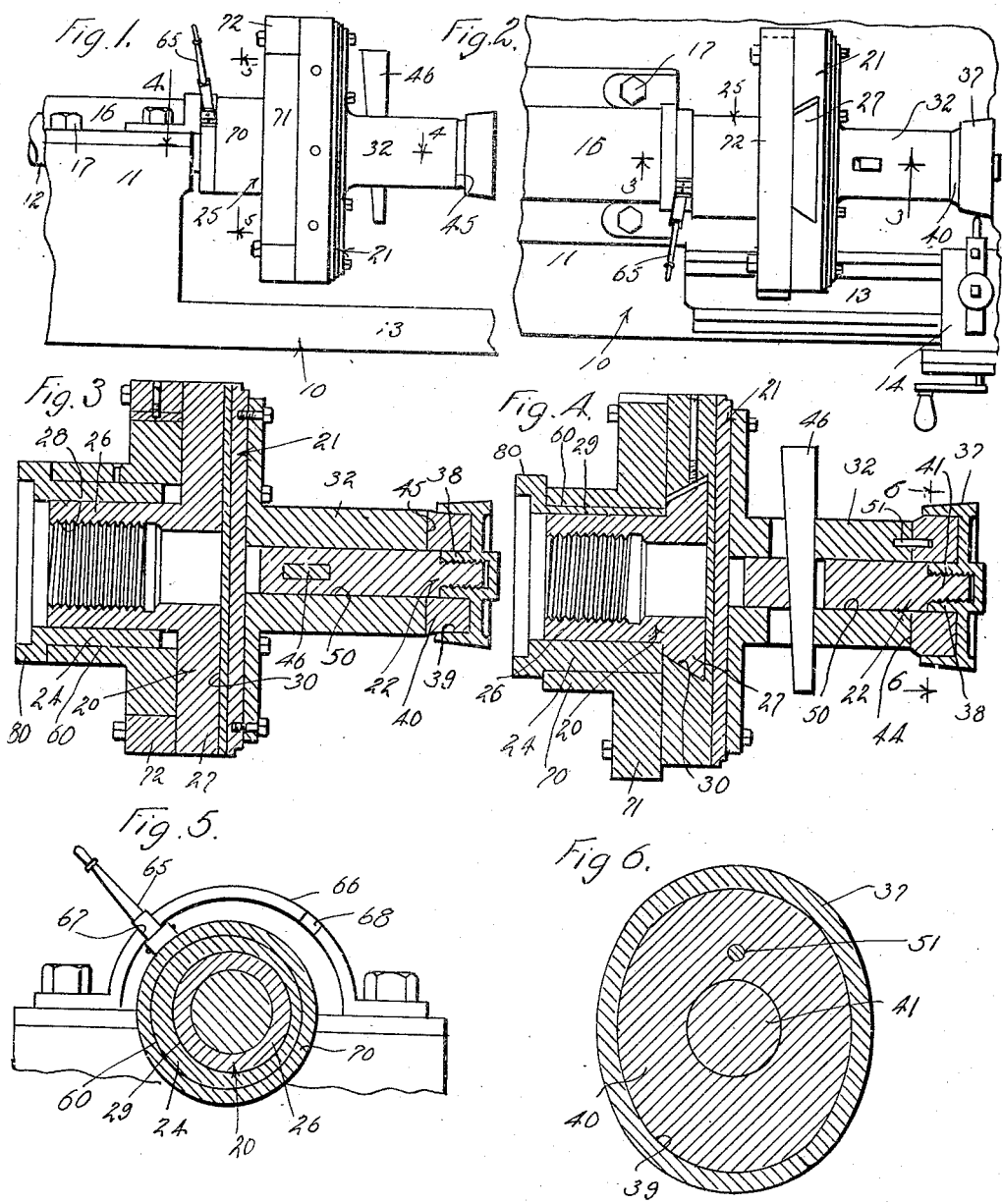
Inventor
Bertram C. Travis
by
his Attorney Patented Mar. 25, 1930

1,751,772

UNITED STATES PATENT OFFICE

BERTRAM C. TRAVIS, OF LOS ANGELES, CALIFORNIA, ASSIGNOR OF ONE-HALF TO PACIFIC COPPER AND BRASS WORKS, INCORPORATED, OF LOS ANGELES, CALIFORNIA, A CORPORATION OF CALIFORNIA

DEVICE FOR FORMING ELLIPTICAL PARTS

Application filed April 6, 1927. Serial No. 181,373.

This invention has to do with a device for forming or turning elliptical parts and it is an object of the invention to provide an effective, simple and practical device of this character.

My invention may be employed in forming or machining elliptical parts of various sizes and of various proportions, and is particularly suited to the formation of metal parts, such as plugs, machine parts, etc. In the present disclosure, I will describe my invention as employed in forming an elliptical boiler plug, it being understood that such reference is not to be construed as limiting or restricting the invention in any way.

It is a primary object of my invention to provide a device operable on or in connection with an ordinary lathe to form elliptical parts.

It is another object of my invention to provide a lathe attachment whereby an ordinary lathe is made operable to form elliptical parts.

It is a further object of this invention to provide a device for forming elliptical parts adjustable to form an ellipse on various axes relative to a given axis.

It is another object of this invention to provide a simple, practical and improved work mounting for a device of the character mentioned.

Another object of the invention is to provide various features of construction which operate to form a simple, effective and practical machine.

The various objects and features of the invention will be best and more fully understood from the following detailed description of a typical form and application of the invention, throughout which description reference is had to the accompanying drawings, in which:

Fig. 1 is a front elevation of a portion of a typical lathe, showing the device provided by my invention applied thereto;

Fig. 2 is a plan view of the parts shown in Fig. 1;

Fig. 3 is an enlarged, detailed, sectional view of the mechanism provided by my invention, being a view taken as indicated by line 3—3 on Fig. 2;

Fig. 4 is an enlarged, detailed view of the device provided by my invention, being a view taken as indicated by line 4—4 on Fig. 1;

Fig. 5 is a transverse, sectional view taken as indicated by line 5—5 on Fig. 1; and Fig. 6 is an enlarged sectional view taken as indicated by line 6—6 on Fig. 4.

The device provided by my invention is suitable for use in connection with a lathe of standard form and, therefore, I have illustrated it as applied to a lathe. The lathe 10, illustrated in the drawings, includes, generally a head 11, a spindle 12 carried by the head, a bed 13 extending from the head, a tool carrier 14 operable on the bed 13, and various other parts usual to machines of this character. The spindle 12 is mounted in the head 11 in the usual form of bearing which includes a removable cap 16 held by bolts or screws 17.

The device provided by my invention includes, generally, a drive member 20, a head 21, means 22 for mounting work on the head, an eccentric 24, and a member 25 operatively connecting the eccentric and head.

The drive member is mounted on and operated directly by the spindle 12 of the lathe and includes a hub 26 to screwthread onto the spindle of the lathe and a slide 27 carried by the hub. The hub 26 is provided with a central screwthreaded opening 28 to receive the spindle of the lathe. The exterior 29 of the hub is turned or finished concentric with the opening 28 to carry the eccentric 24, as will be hereinafter described. The slide 27 is diametrically disposed at the outer end of the hub and, in the form of the invention shown in the drawings, is formed integral with the hub.

The head 21 is carried and driven by the drive member 20. The head 21 is provided in its inner face with a guideway 30 which slidably receives the slide 27 of the drive member. In practice, the slide 27 and guideway 30 are dovetailed together, as shown in Fig. 4 of the drawings, so that the head is properly retained on the drive member at the same time being slidable on the drive member longitudinally of the slide 27. A work holder 32 is centrally located on the outer face of the head and is adapted to carry the work to be handled by the device.

The means 22, provided for mounting work on the holder 32, may vary widely with the type or form of work to be handled so, therefore, I do not wish my invention understood as limited to any particular work mounting means. For purpose of example, however, I will describe my invention as applied to holding a plug 37 having a central internally threaded projection 38 and an elliptical recess 39 surrounding the projection. In mounting the plug, I provide a block 40 to fit the recess 39 and a stem 41 to connect with the projection 38. The block 40 fits around the projection 38 and into the recess 39 and has its outer face 44 finished to seat against the end 45 of the work holder 32. The stem 41 has a screwthreaded part at its outer end to extend into the projection 38. The stem is adapted to extend into a socket or opening 50 in the work holder and thus hold the block 37 in position on the end of the work holder, as shown in Figs. 3 and 4 of the drawings. The stem 41 may be releasably held in the work holder in any suitable manner; for instance, I may use a wedge 46, such as I have shown in Fig. 4 of the drawings. I provide means for locking the block 40 against rotation on the work holder. This means may include a pin or projection 51 on the end of the work holder to extend into a suitable opening or hole in the block 40. The recess 38 and block 40 being elliptical, the plug cannot turn on the block.

The eccentric 24 is mounted on the exterior of the hub 26 and is held stationary so that the hub turns in it. The exterior 60 of the eccentric is turned or formed so that its axis is offset with reference to the interior of the eccentric and, therefore, to the axis of the lathe spindle. In practice, the eccentric may be made so that its exterior has the desired amount of eccentricity relative to the lathe axis. The eccentricity of the exterior of the eccentric determines the difference between major and minor axes of the ellipse to be formed by the device, the difference between the axes of the ellipse being equal to the throw of the eccentric. The eccentric is stationary and, in practice, any suitable means may be provided to hold it in the desired position. In the drawings, I have shown a projection 65 provided on the eccentric to co-operate with a part 66 stationary with the frame of the lathe. I have shown the projection 65 in the form of a latch lever pivotally connected with the eccentric and I have shown the part 66 in the form of a notched segment held by means of the screws 17 which hold the lathe bearing cap 16. I provide the segment 66 with notches 67 and 68 to receive the latched lever so that the eccentric can be set in two different positions. In the particular case shown in the drawings, the notches 67 and 68 are located ninety degrees apart, thus making it possible with this particular device to set the eccentric in two different positions ninety degrees apart.

The member 25 which connects the eccentric and head so that the action of the eccentric is imparted to the head includes a sleeve 70 which surrounds or is mounted on the exterior of the eccentric and a slide 71 formed on the sleeve and carried between guide members 72 on the inner face of the head. The sleeve 70 is rotatably mounted on the exterior of the eccentric. The slide 71 is diametrically disposed at the end of the sleeve and engages the inner face of the head to slidably fit between the guides 72 which are fixed in parallel spaced relation on the inner face of the head. The guides 72 extend at right angles to the guideway 30 which carries the slide of the drive member. The member 25 is held in proper operating position between a flange 80 on the eccentric and the inner face of the head.

In using the device, the drive member 20, to which the other parts in the device are connected, is applied to the spindle of a lathe and the lever latch 65 is engaged in one of the notches in the segment 66 applied to the lathe to set the eccentric against rotation. The work, for instance, the plug 37, is then mounted on the work holder 32 by means of the block 40 and stem 41. If the plug 37 is to be cut with a lathe tool, or the like, the eccentric 24 is set so that the eccentricity of its exterior is in the direction from which the lathe tool is to be advanced into engagement with the plug. For instance, if the lathe tool is to be fed into engagement with the work in a horizontal plane at substantially the level of the lathe axis, the eccentric is set so that its eccentricity is in a horizontal direction. With the device thus set, the lathe is put in operation so that its spindle rotates and thus carries with it the drive member 20. The drive member 20, through its engagement with the head 21 by the slide 27 and guideway 30, causes the head to rotate with the lathe spindle. The head in rotating carries with it the member 25 because of the slide portion 71 of the said member being carried between the guides 72. This operation of the member 25 causes it to rotate on the exterior of the eccentric. The member 25, being mounted on the eccentric, rotates about an axis offset relative to the lathe spindle. The head 21, being slidably connected with the drive member which is concentric with the lathe spindle and with the member 25 which is eccentric to the lathe spindle, is influenced in its movement by both the drive member and the member 25 so that it rotates at the same time that it moves in an elliptical orbit. During this operation, the slide 27 and guideway 30 co-operate to allow the head to move elliptically relative to the lathe center at the same time that it turns with the lathe spindle. The slide 71 and guides 72, being at right angles to the slide 27 and guideway 30, allow the head to move elliptically relative to the member 25 at the same time that it rotates with the member 25. With the head 21 thus rotated and at the same time moved elliptically, a lathe tool fed into engagement with the plug carried by the head will operate to cut or dress the plug so that it is elliptical in form. It will be obvious that the plug may be made tapered by suitably feeding the tool. In practice, after the plug or other work has been cut by means of a lathe tool, or the like, it is desirable to dress or finish it with a file. It is most practical and convenient to operate a file horizontally across the top of the work as it is rotated by the lathe. To thus finish work that has been machined by my device, the operator may shift the position of the eccentric through the mechanism above described, thus shifting the direction of oscillation of the head ninety degrees from a usual cutting position. The head will then reciprocate vertically on a diametrical axis, thus allowing the operator to run a file, or other tool, across the top of the work in a manner to effectively finish it.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A device of the character described including a drive member to be rotated, a head mounted on the drive member to be movable diametrically thereof, a stationary eccentric, and a part rotatably mounted on the eccentric and having a sliding connection with the head, the drive member being rotatable in the eccentric.

2. A device of the character described including a drive member to be rotated, a head mounted on the drive member to be movable diametrically thereof, an eccentric bearing on the drive member, means holding the eccentric against rotation, and a part surrounding the eccentric to be rotatably carried by the eccentric and having a sliding connection with the head.

3. A device of the character described including a drive member to be rotated, a head mounted on the drive member to be movable diametrically thereof, an eccentric bearing on the drive member and a part surrounding and carried by the eccentric and having a sliding connection with the head, the part and head being slidable relative to each other in a direction at right angles to that at which the drive member and head are relatively movable.

4. A lathe attachment including a drive member to be mounted on the spindle of a lathe, a head mounted on the drive member to be movable diametrically thereof, an eccentric bearing on the drive member and a part surrounding the eccentric and rotatably carried by the eccentric and having a sliding connection with the head.

5. A lathe attachment including a drive member to be mounted on the spindle of a lathe, a head mounted on the drive member to be movable diametrically thereof, an eccentric bearing on the drive member, means connecting the eccentric and lathe so that the eccentric is stationary, and a part rotatably carried around the eccentric and having a sliding engagement with the head.

6. A lathe attachment including a drive member to be mounted on the spindle of a lathe, a head mounted on the drive member to be movable diametrically thereof, an eccentric, means connecting the eccentric and lathe so that the eccentric is stationary, and a part carried by the eccentric and having a sliding engagement with the head, said means including a latch member carried by the eccentric to engage a part fixed to the lathe.

7. A lathe attachment including a drive member to be mounted on the spindle of a lathe, a head mounted on the drive member to be movable diametrically thereof, an eccentric, means connecting the eccentric and lathe so that the eccentric is stationary, and a part carried by the eccentric and having a sliding engagement with the head, said means including a part fixed to the lathe and having a plurality of notches and a latch carried by the eccentric operable to engage one of the notches.

8. A device of the character described including a drive member to be rotated, a head mounted on the drive member to be movable diametrically thereof, work holding means on the head, an eccentric bearing on the head, and a part rotatably carried around the eccentric and having a sliding connection with the head.

9. A device of the character described including a rotatable drive member having a hub and a slide extending diametrically of the hub, a head slidably carried on the slide, an eccentric rotatably carried on the hub and held against rotation, and a part rotatably carried around the eccentric and slidably engaging the head.

10. A device of the character described including a rotatable drive member having a hub and a slide extending diametrically of the hub, a head slidably carried on the slide, an eccentric rotatably carried on the hub and held against rotation, and a part surrounding the eccentric to be rotatably carried on the eccentric and having a slide engaging the head at right angles to the slide of the drive member.

11. A device of the character described including a drive member having a hub to be mounted on a lathe spindle and a slide on the end of the hub extending diametrically of the hub, a head carried on the slide, a work mounting carried by the head, an eccentric mounted on the hub, means holding the eccentric against rotation, and a part surrounding the eccentric and rotatably carried on the eccentric and having a slide connected with the head at right angles to the slide of the drive member.

12. In a device of the character described, a mounting for an object having an elliptical opening and a screw-threaded part including a block to be inserted in the opening, a stem to engage the threaded part, a holder to receive the stem and form an abutment for the block, and means for releasably setting the stem in the holder.

13. In a device of the character described, a mounting for an object having an elliptical opening and a screw-threaded part including a block to be inserted in the opening, a stem to engage the threaded part, a holder to receive the stem and form an abutment for the block, and a wedge for releasably setting the stem in the holder.

14. A device of the character described including a drive member to be rotated, a head mounted on the drive member to be movable diametrically thereof, an eccentric rotatably bearing on the drive member, a part surrounding the eccentric and rotatably carried by the eccentric and having sliding connection with the head, and means controlling the rotational position of the eccentric.

In witness that I claim the foregoing I have hereunto subscribed my name this 30th day of March 1927.

BERTRAM CECIL TRAVIS.